United States Patent [19]
Preston et al.

[11] Patent Number: 5,977,527
[45] Date of Patent: Nov. 2, 1999

[54] CHANGEOVER FIXTURE FOR INDUCTION BRAZING WORK STATION

[75] Inventors: Mark E. Preston, Fairport; Ronald D. Spoor, Dundee; Bruce F. Westphal, Hilton; Tadeusz Urbanowicz, Rochester, all of N.Y.

[73] Assignee: Bausch & Lomb Incorporated, Rochester, N.Y.

[21] Appl. No.: 09/079,784

[22] Filed: May 15, 1998

[51] Int. Cl.$^6$ .................................................. H05B 6/10
[52] U.S. Cl. ...................... 219/615; 218/616; 218/635; 218/647; 218/656; 218/652; 218/676
[58] Field of Search .................... 219/615, 603, 219/616, 617, 635, 647, 652, 655, 656, 672, 676

[56] References Cited

U.S. PATENT DOCUMENTS

| | | | |
|---|---|---|---|
| 3,988,559 | 10/1976 | Capolongo | 219/635 |
| 4,017,703 | 4/1977 | Lavins, Jr. et al. | 219/635 |
| 4,313,679 | 2/1982 | Wolff et al. | 219/647 |
| 4,569,218 | 2/1986 | Baker et al. | 219/647 |

*Primary Examiner*—Philip H. Leung
*Attorney, Agent, or Firm*—Katherine McGuire

[57] ABSTRACT

A fixture for an induction brazing station includes a removable front plate on which is mounted a work piece holder. The base of the induction unit mounts to a back plate lying coplanar with the front plate on the work surface. The coil of the induction unit is uniquely matched to the front plate and the work piece holder. The induction coil removably mounts to the front plate when not in use such that the front plate may be removed from the work surface with the work piece holder and coil mounted thereon. A different front plate may then be mounted upon the work surface having a different coil configuration and work piece holder. The coil(s) are removed from the front plate and attached to the induction base on the back plate. The coil extends to the work piece holder on the front plate in the correct position. The invention provides for quick changeover between different induction units at a single work station.

28 Claims, 7 Drawing Sheets

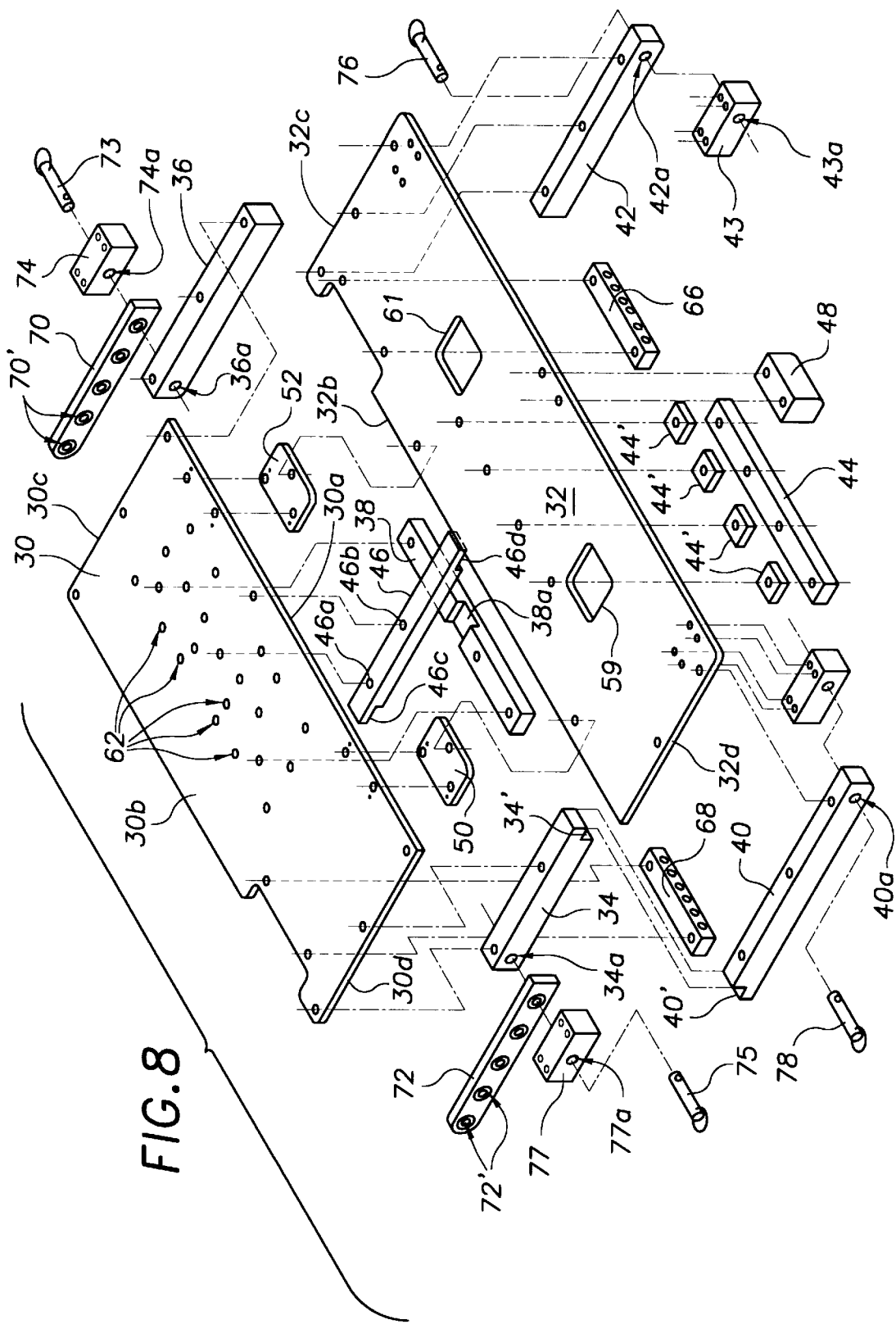

CHANGEOVER FIXTURE FOR INDUCTION BRAZING WORK STATION

BACKGROUND OF THE INVENTION

The present invention relates to manufacturing of metal eyewear frames. The invention more particularly relates to a fixture which allows for rapid changeovers between different induction brazing units at a single work station.

Metal eyewear frames are manufactured in an ever-changing variety of styles. A common metal eyewear frame includes right and left eyewires wherein right and left lenses are secured. A separate bridge element and/or brace interconnects the eyewires, and a pair of nose pads are typically attached to the front frame adjacent the bridge. A pair of temples are pivotally secured to opposite sides of the front frame to complete the eyewear frame assembly. Common methods employed to join the various metal components of an eyewear frame together include resistance brazing and induction brazing. Induction brazing is more difficult and expensive to carry out than resistance brazing but provides a superior connection between the metal parts.

In induction brazing, the eyewear frame components to be joined are positioned in a work piece holder mounted to a work surface. An induction unit having a base is mounted to the work surface adjacent to the work piece holder (typically behind the work piece holder). Induction units are commercially available through HAUG of Switzerland. The induction unit carries an induction coil which has a configuration matched to the particular eyewear components being joined. The induction unit base is mounted to the work surface with the induction coil extending to the work piece in a very precise positional relationship. A worker places the metal frame parts into the work piece holder and activates the induction coil to join the parts.

As stated, the configuration and placement of the induction coil must be precisely matched to the configuration of the work piece. A single eyewear frame may require induction brazing of many parts, e.g., the nose pad arms to the eyewires, the eyewires to the bridge and/or brace, and end pieces to the opposite side of the eyewires. Prior to the present invention, either multiple induction brazing work stations were required to join these different joints, each with its own specially configured and positioned induction coil, or the induction units themselves would need to be changed at a particular work station. Both of these options have proven expensive. Each induction work station costs upwards of $40,000.00USD and it is therefore an expensive proposition to have a separate work station for each joint being brazed for every style of eyewear frame being produced. Furthermore, to change induction units at a single work station is also very expensive in that it typically requires two to three days to complete a changeover of induction units due to the exacting configuration and positioning requirements of the induction coils with regard to the particular work piece. Quickly identifying the proper coil configuration for a particular frame style and joint is also a problem. Thus, while induction brazing of metal eyewear frames is very desirable from the standpoint of quality, it is also very expensive and problematic for the reasons discussed above.

SUMMARY OF THE INVENTION

The present invention successfully addresses the above problems by providing a unique fixture for an induction brazing work station. The fixture comprises a pair of aligned fixture plates which are individually, removably mounted to a work station surface. The plates are arranged in nearly abutting, coplanar relationship, one behind the other, with regard to the front facing position of a seated worker. The back plate is adapted to receive the bases of a pair of induction units. It is typical that a pair of induction units be used simultaneously at a single work station since an eyewear frame is usually symmetrical with multiple pairs of joints requiring brazing, although a some eyewear styles may have a particular joint requiring a single induction coil at a work station.

The front plate is adapted to receive the work piece holder and the induction heads when not in use. As stated above, the coil configuration of the induction units is precisely matched to the work piece joint being brazed. The work piece holder is also matched to the work piece. It is therefore an advantage of the invention that the induction heads (which include the induction coils) be matched to the work piece holder, and that they are together carried on the removable front plate. In this way, when it is desired to change between eyewear frame styles being worked, the worker simply removes the front plate from the work surface (together with the work piece holder and induction heads matched to that holder), and replaces it with a different front plate carrying a different work piece holder and paired induction heads matched to the new work piece holder.

As stated above, the back plate is adapted to receive the induction unit bases. The positioning of the induction unit base determines the positional relationship of the induction coil to the work piece. Prior to the present invention, the induction unit bases where bolted directly to the work surface which required time-consuming measurements to obtain the required positional relationship between the induction unit coil and the particular work piece. With the present invention, the back plate includes a predetermined pattern of holes providing alternate alignment positions for mounting of the induction units thereon. The pattern preferably includes each different position required for the induction unit for each different joint of the work piece being brazed. For example, if a particular eyewear frame has three different paired joints to braze (e.g., one pair to join the bridge to the eyewires; one pair to join the nose pad arms to the eyewires; and one pair to join the end pieces to the eyewires), then the pattern would provide for three different, alternate mounting positions for each induction unit base thereon.

In a preferred embodiment of the invention, the rear-most edge of the back plate may be selectively raised and lowered about a horizontal pivot axis extending along the front edge of the front plate. Since the front plate is attached to the back plate, the two plates pivot together to slant the plates at a desired angle to orient the work piece and induction coils in a fashion which is comfortable to the worker. A plurality of identical work pieces are sequentially brazed at a single work station.

When it is decided to change frame styles being worked, the worker simply and quickly removes the induction coils from the back plate and removably mounts them to the front plate, leaving the induction unit bases on the back plate. The worker then removes the front plate from the work surface, leaving the back plate, and substitutes a different front plate having a different work piece holder and induction coils, all matched to the new style to be worked. The induction coils are removed from the front plate and mounted to the bases in the back plate in the position required for the particular joint to be brazed on the new style. In this way, the induction coil will be matched to the frame style and be automatically positioned in the correct relationship to the work piece holder. This changeover between different work piece holders and induction units takes as little as about twenty minutes. When compared to the two to three days it previously took to complete this changeover, the benefits of the present invention are strikingly apparent.

BRIEF DESCRIPTION OF THE DRAWINGS

FIG. 8 is an exploded perspective view of the fixture.

DETAILED DESCRIPTION

Figure 1:
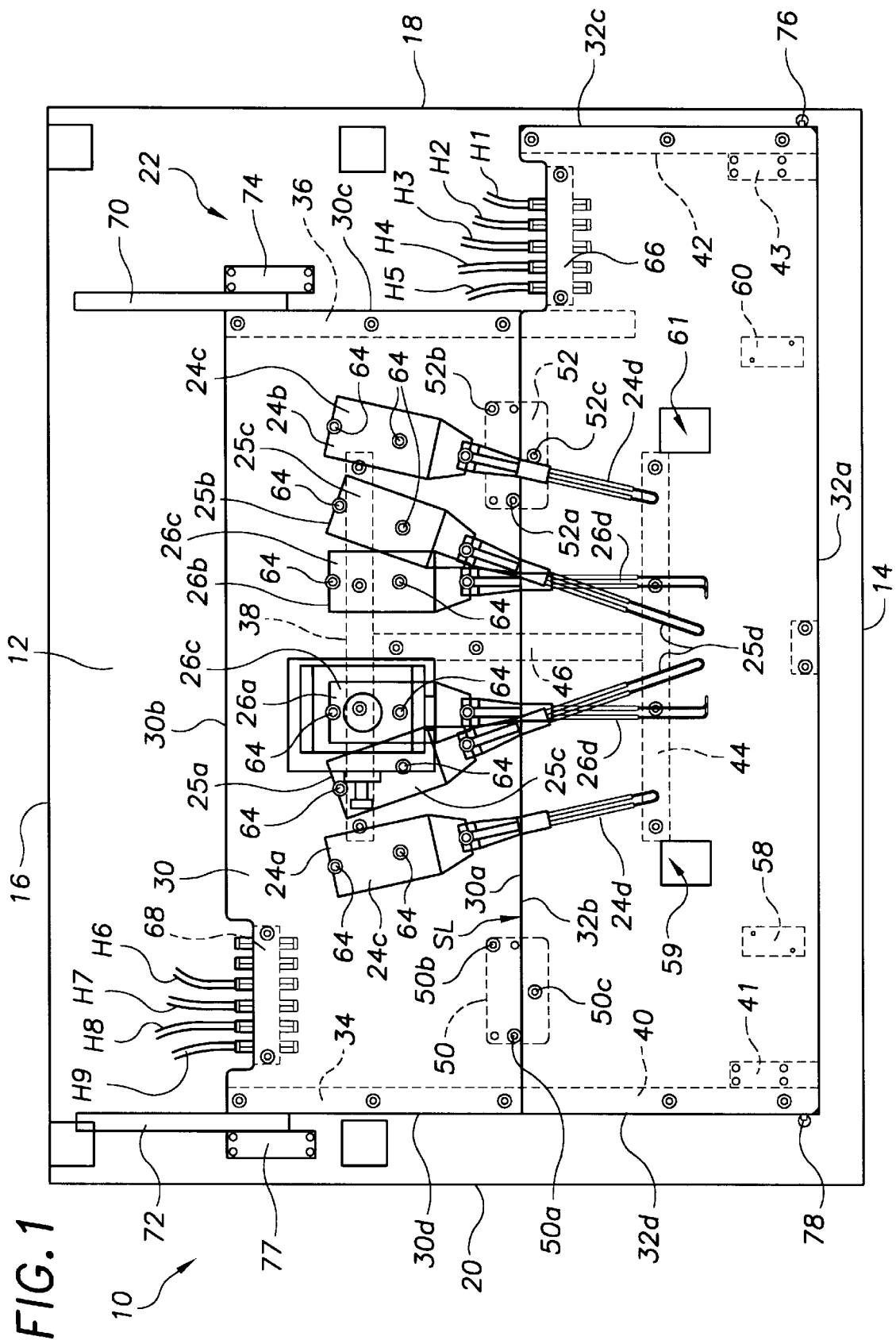
FIG. 1 is a top plan view of an induction brazing work station employing the present invention.
Figure 2:
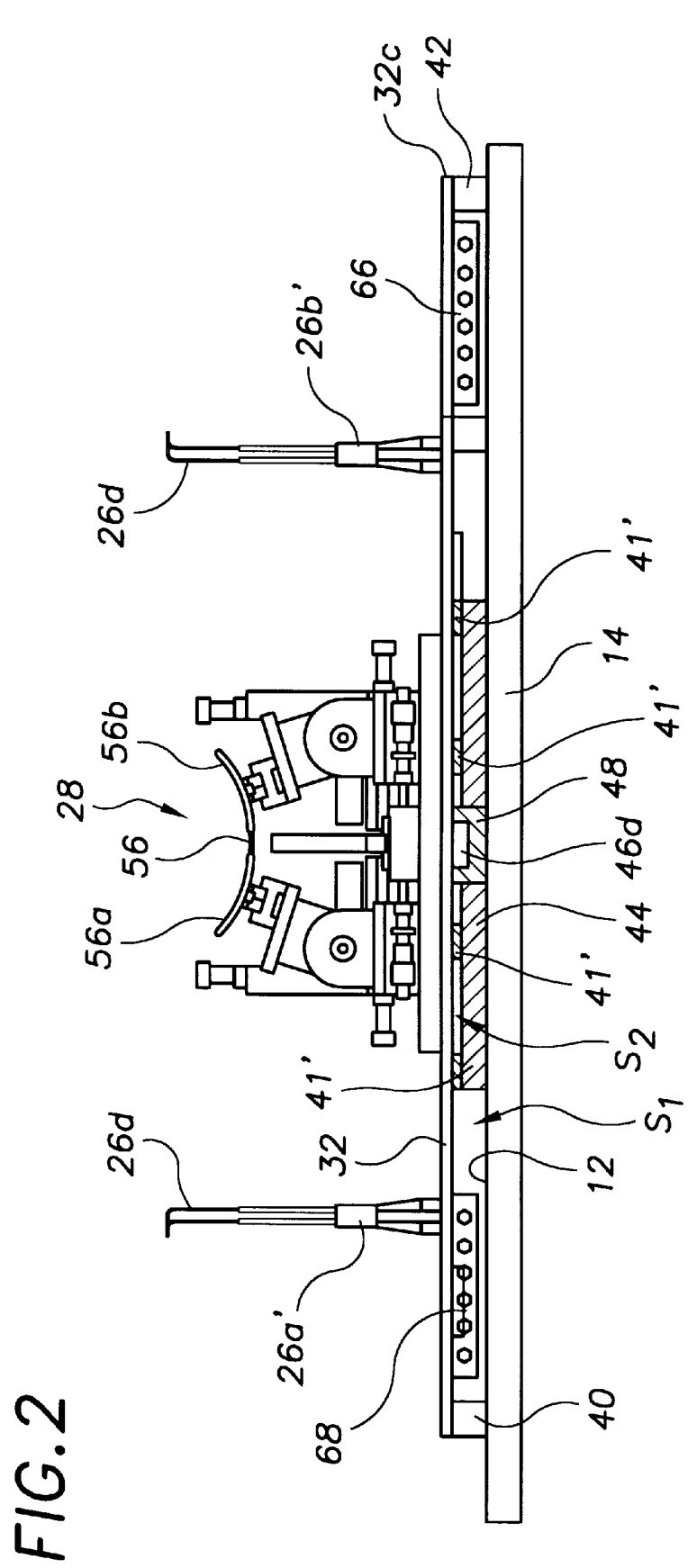
FIG. 2 is a front, elevational view thereof.

Referring now to the drawing, there is seen in FIGS. 1 and 2 an induction brazing work station 10, including a work surface 12 having opposite front and rear edges 14,16 and side edges 18,20, respectively. A worker would sit in front of work surface 12 facing front edge 14 thereof. The present invention comprises an induction brazing fixture 22, individually illustrated in FIGS. 3–8, which permits very rapid changeover between different eyewear frame styles being worked, as will be discussed in more detail below. Although only one pair of induction units would be utilized at a time, three pairs of induction units 24a,24b, 25a,25b, and 26a, 26b, respectively, are seen in FIG. 1 to show the alternate positioning of the units which the present invention makes possible, as discussed further below.

The basic prior art method of induction brazing of metal eyewear frames involves mounting one or, more commonly, a pair of induction units directly to a work table. A work piece holder such as that designated by 28 in FIG. 2, is also mounted directly to the work table forwardly of the induction units with respect to the seated worker. The induction units basically comprise a charging base and an induction coil extending from the base, such as bases and coils 24c,24d, 25c,25d and 26c,26d seen in FIG. 1, respectively. The tips of the induction coils are uniquely configured to each type and position of joint they braze. (Thus, since the three pairs of induction units 24,25,26 each braze a different joint on a metal eyewear frame, each pair has a different tip configuration). In the prior art method, the induction unit is positioned directly on the work table so the coil tip extends in the proper position with regard to the joint being brazed. As stated above, the prior art required re-mounting of work holders and induction units to change between styles and/or joints being brazed. Since the induction units and work holders were mounted directly to the work surface (typically with bolts), the changeover process was time-consuming and expensive.

Discussion is now turned to the inventive fixture 22 which simplifies the changeover process and significantly reduces the time required to complete a changeover of induction units and/or work piece holders at a work station. As seen in the various figures, fixture 22 includes a back plate 30 and front plate 32 which are mounted in abutting, coplanar relationship on work surface 12. More particularly, back plate 30 is of generally rectangular outline and includes opposite front and rear edges 30a,30b and opposite side edges 30c,30d, respectively. Front plate 32 likewise is generally rectangular in outline and includes opposite front and rear edges 32a,32b and opposite side edges 32c,32d. When mounted to work surface 12, the front edge 30a of back plate 30 and the rear edge 32b of front plate 32 align to define a seam line with a slight gap SL (FIGS. 1,3–5).

In the preferred embodiment of the invention, plates 30,32 are raised relative to the work surface 12 which facilitates movement of the plates and quick-disconnect hoses $H_1$–$H_9$ as will be described in more detail below. Thus, as seen in FIG. 2, a space $S_1$ is created between the plates 30,32 and surface 12. In this regard, a plurality of members are provided on the bottom surface of plates 30,32 as follows:
For back plate 30

Side bars 34,36 which extend colinearly to opposite side edges 30d,30c, respectively.

Center bar 38 which extends parallel to and approximately mid-way between front and rear edges 30a,30b thereof, respectively.
For front plate 32

Side bars 40,42 which extend colinearly to opposite side edges 32d,32c thereof, respectively.

Center bar 44 which extends parallel to and approximately mid-way between front and rear edges 32a,32b thereof, respectively. A plurality of spacers 44' are provided between center bar 44 and the bottom surface of front plate 32 to create a space $S_2$ therebetween (FIG. 2) for reasons explained below.

A cross bar 46 extends between center bars 38 and 44 and is mounted to back plate 30 at points 46a,46b (FIGS. 5,8) via screws (not shown). The back plate center bar 38 is seen to include a cut-out 38a in the center thereof wherein the rear, notched end 46c of the cross bar 46 is inserted (commonly referred to as a dado/rabbet joint in the construction arts). The front end 46d of the cross bar 46 is also notched and is inserted into the space S2 between center bar 44 and front plate 32. Cross-bar 46 is thus not directly attached to front plate 32 which may thus be easily mounted and removed from work surface 12 by sliding notched end 46d into and out of space $S_2$.

Figure 3:
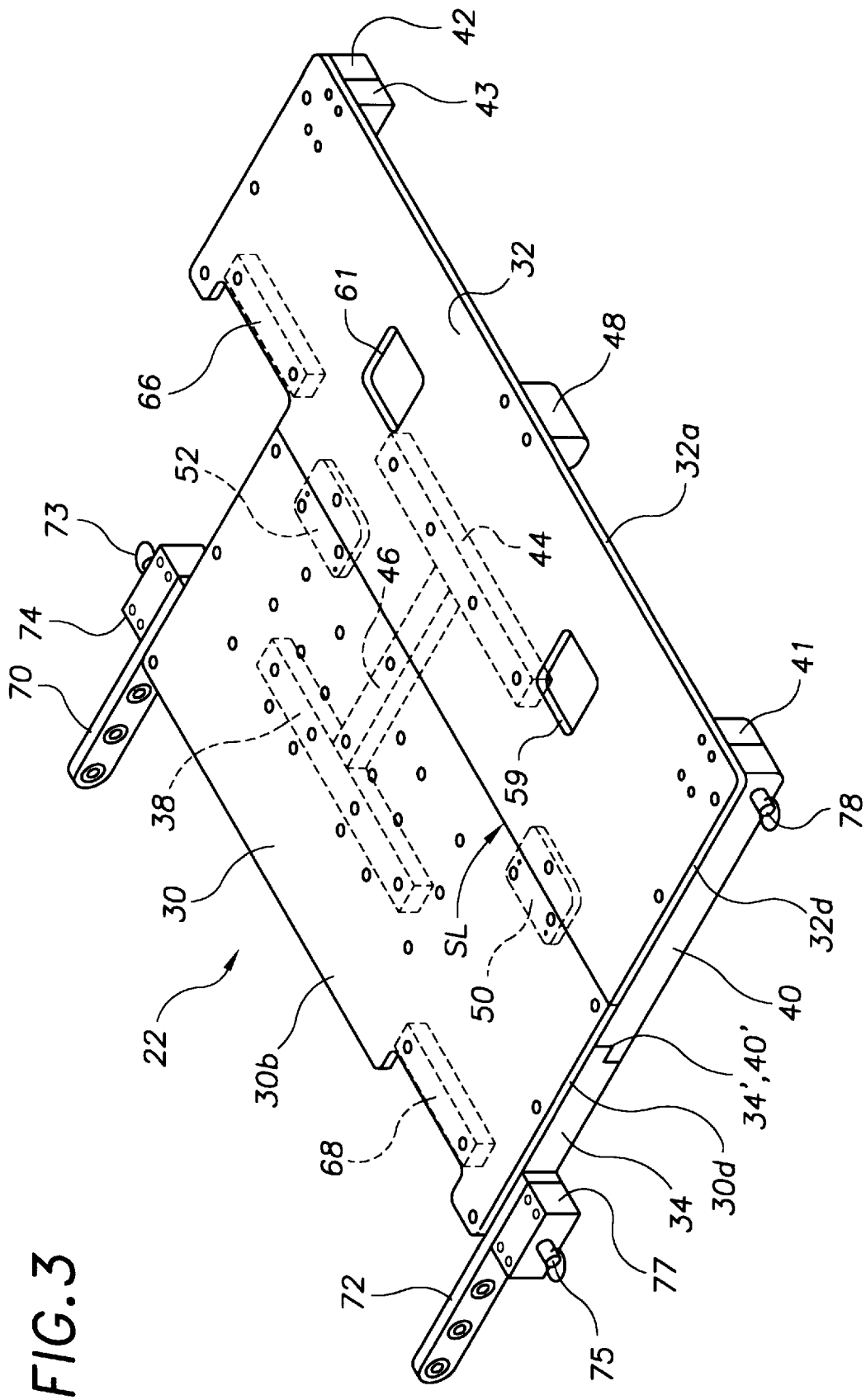
FIG. 3 is a front perspective view of the fixture of the present invention.
Figure 4:
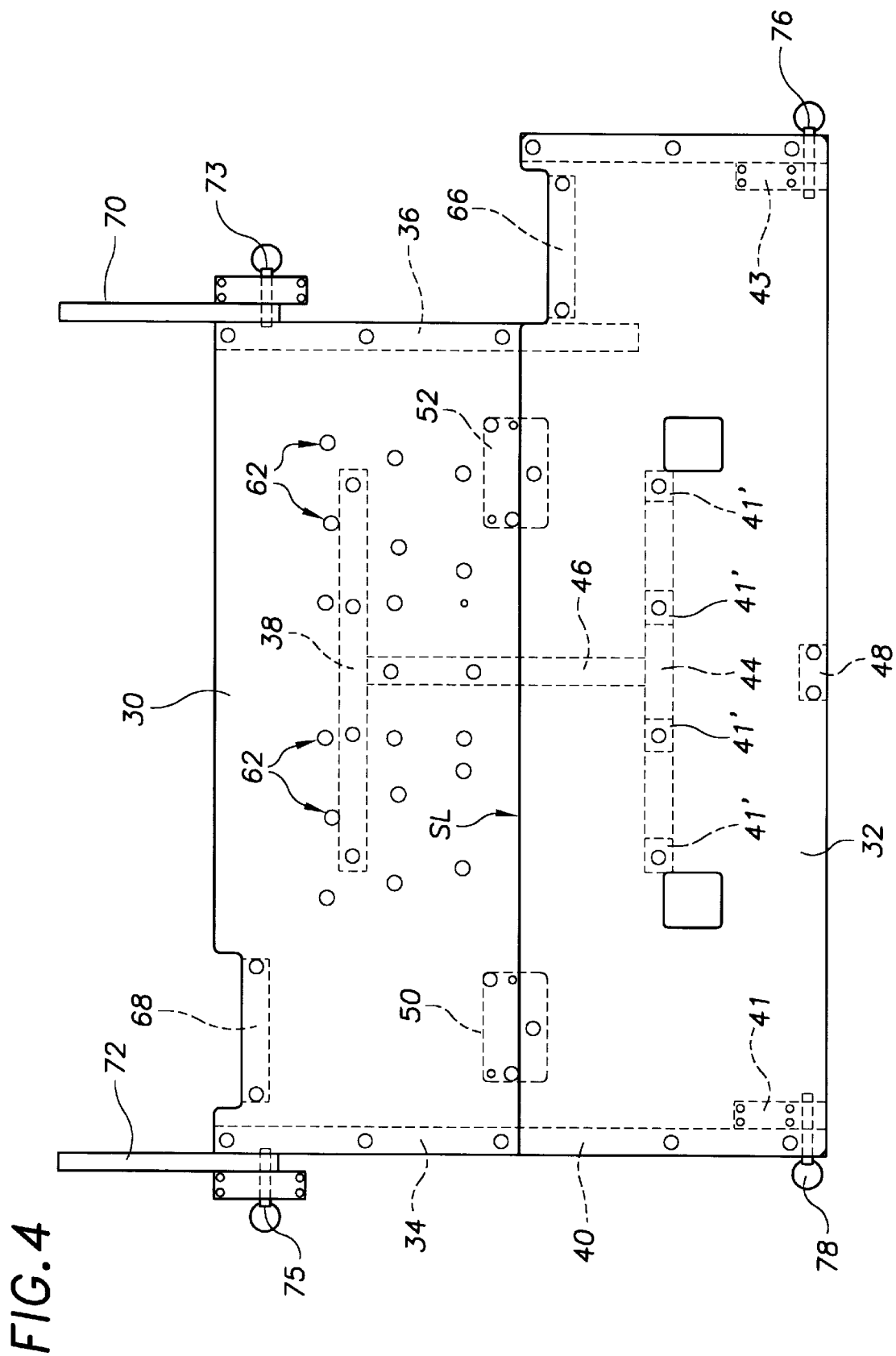
FIG. 4 is a top plan view thereof.
Figure 5:
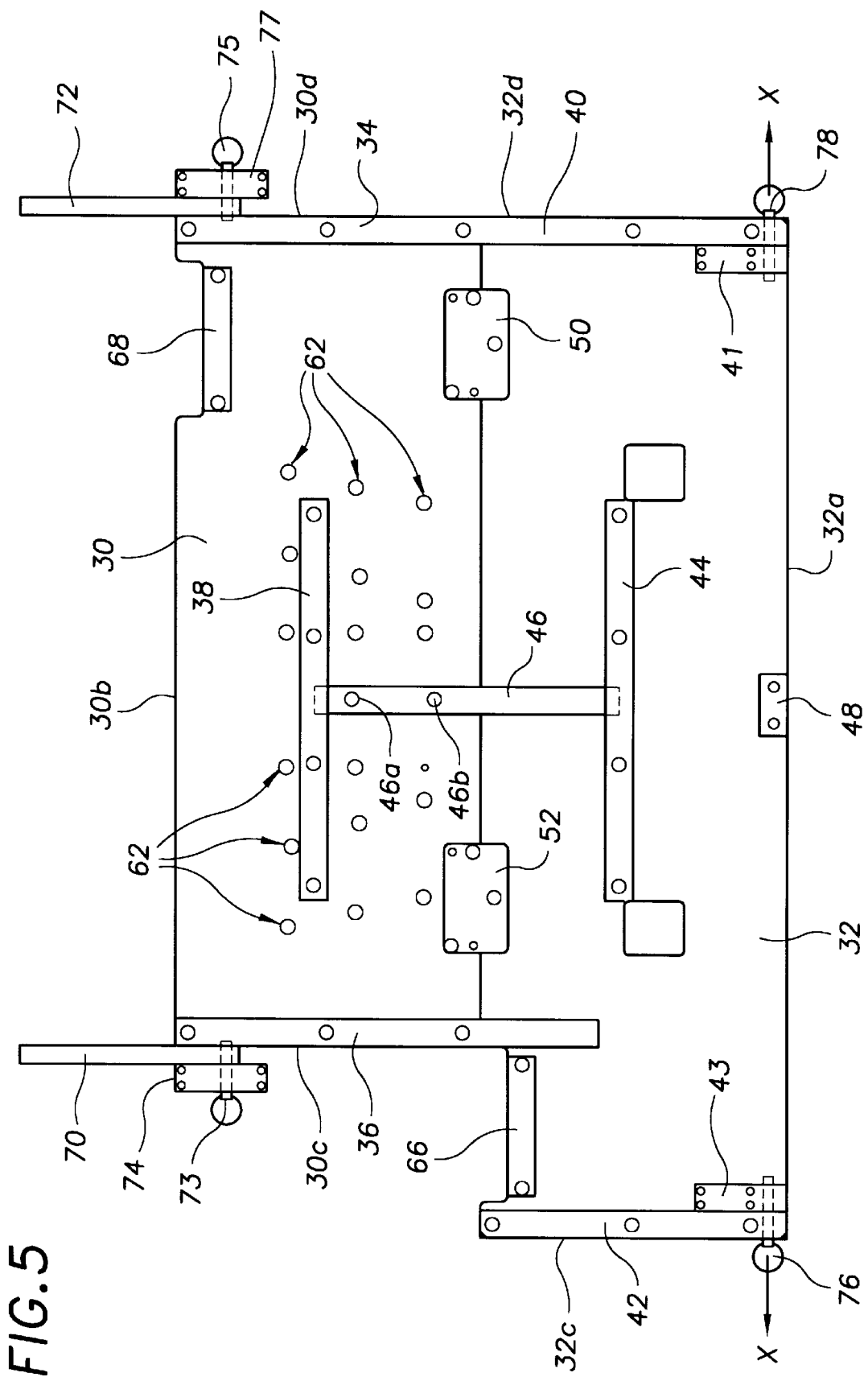
FIG. 5 is a bottom plan view thereof.

Further back and front plate alignment means are provided by a pair of small, rectangular liners 50,52 which span seam line SL in the assembled position of plates 30,32. Liners 50,52 are mounted directly to back plate 30 at through holes 50a,50b and 52a,52b, respectively, and a pair of alignment pins (not shown) are provided at points 50c,52c which extend through front plate 32 and thereby align front plate 32 with back plate 30. Besides the alignment means provided by plates 50,52 and notched end 46d in space $S_2$, yet a further alignment point is provided by mating notched end 34' of side bar 34 with the notched end 40' of side bar 40 (FIGS. 3 and 8).

As explained above, the present invention allows for the quick and simple changeover of the work station to accommodate different work pieces being brazed. Both the configuration of the induction coil tip and its position with respect to the work piece holder are unique to the particular joint being brazed. Thus, referring to FIG. 2, a unique work piece holder 28 for holding an eyewear frame front 56 having right and left eyewires 56a,56b, respectively, is mounted to front plate 32. As seen in FIG. 1, front plate 32 includes a pair of right and left mounts 58,60 which are configured to removably receive the induction coil heads 26a',26b' which are matched to a particular eyewear frame style 56 and thus also work piece holder 28. More particularly, work piece holder 28 is configured to hold a unique style of an eyewear frame front such as front 56. The frame front 56 requires brazing of paired joints thereof, e.g. at the bridge-to-eyewire-interface, although it is understood that a different eyewear frame style may require the use of a single induction unit. Induction coils 26d of induction units 26a,26b have a tip configuration which is uniquely configured to the frame style and joint being brazed. Thus, the work piece holder 28 and induction coils 26d are matched to each other and to the front frame style to be brazed.

To prepare the work station 10 to braze these particular joints of the front frame 56, the front plate 32, on which work piece holder 28 and induction coils 26d are mounted, is attached to back plate 30 by sliding notched end 46d of the cross bar 46 into the space $S_2$ located between the middle two spacers 44' on the bottom surface of front plate 32; aligning the pins of liners 50,52 at points 50c,52c of front plate 32; and mating notched ends 34',40' of side bars 34,40. Once the front plate 32 is thusly mounted to back plate 30, induction coil heads 26a',26b' are lifted from mounts 58,60 and attached to their respective bases 26a,26b on back plate 30. The work station is thus ready to receive an eyewear frame front in work piece holder 28 for brazing.

As discussed above, the position of the induction base on the back plate 30 may be changed depending on the type and position of joint to be brazed. In this regard, a pattern of through holes 62 are formed in back plate 30 (FIGS. 5 and 8) into which bosses 64 which are fixed to the induction bases 24a,24b,25a,25b, 26a,26b may be inserted (FIG. 1). As discussed, only one pair of induction units would be utilized at a time, although FIG. 1 illustrates three pairs of induction units to show the alternate positioning of the induction units which is possible on back plate 30 by aligning bosses 64 with selected holes 62. The pattern of holes 62 is predetermined so as to provide the positioning for each different induction unit used for the various joints of a particular eyewear frame style. Thus, the three pairs of induction units illustrated in FIG. 1 may be alternately used in brazing a particular eyewear frame style, with each pair being used for a different pair of joints being brazed on that frame.

The operation of the induction units requires the use of certain liquids and/or gases such as air to operate pneumatic controls, water for cooling, and an inert gas to prevent burning. In this regard, a plurality of hoses $H_1$–$H$, are provided along back plate rear edge 30b, and along front plate rear edge 32b, with the hoses extending beneath the plates to the work piece holder 28. Since rear plate 30 and front plate 32 are removable from work surface 12, hose connection interfaces 66 and 68 are provided on back plate 30 and front plate 32. Each hose $H_1$–$H_9$ is provided with a quick disconnect at interface 66,68 such that the hose hook-ups may be quickly disconnected and reconnected for each changeover of the back and front plates 30,32. Also, front plate 32 may include a pair of openings 59,61 to accommodate a respective pair of hoses for a particular fixture, if required.

It is noted that most changeovers of the work station require only the change of the front plate 32 in order to switch to different induction coils and work piece holders; however, back plate 30 is also removable should it be required. To remove the back plate 30, the front plate 32 would first be removed in the manner described above, and then hoses $H_6$–$H_9$ would be disconnected and pins 73,75 removed from holes 74a,70',36a and 77a,72',34a, respectively. The back plate 30 would then be free to be lifted from work surface 12.

Figure 6:
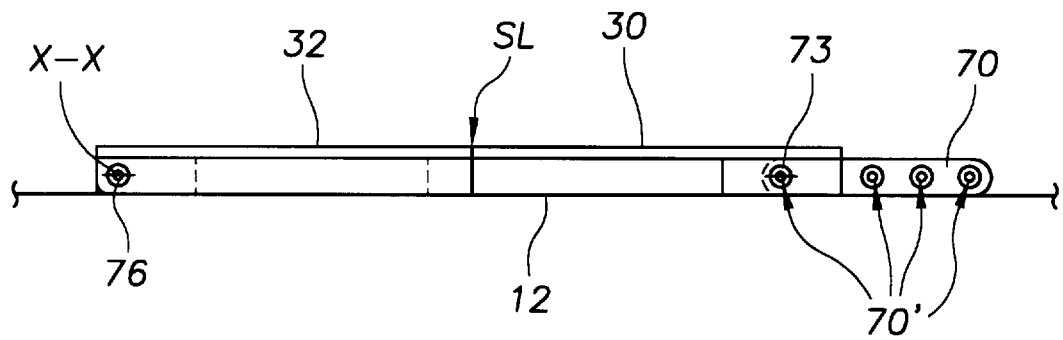
FIG. 6 is a side, elevation view thereof showing the plates in their lowered position.
Figure 7:
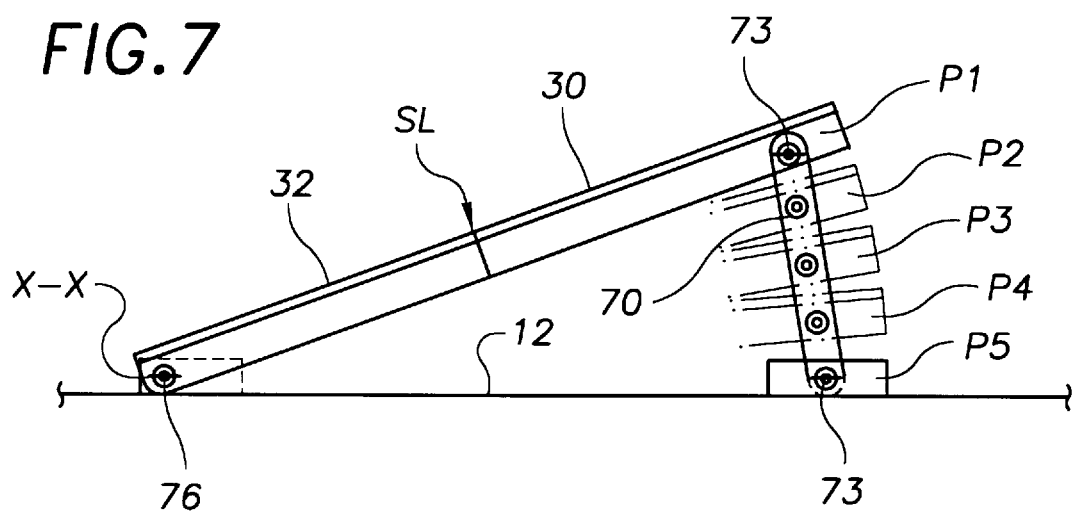
FIG. 7 is the view of FIG. 6 showing the plates in their raised positions.

In a preferred embodiment of the invention, the incline of the rear and front plates 30,32 relative to stationary work surface 12 may be selectively changed according to the desires and comfort of the worker. As seen in FIGS. 6–8, back plate 30 is provided with adjustable arms 70,72 along side edges 30c,30d thereof, respectively, adjacent the rear edge 30b thereof. Arms 70,72 each include a series of holes 70',72' formed therethrough, a selected one of which is aligned between holes 74a,36a of spacers 74,36 on the right, and between holes 77a,34a of spacers 77,34 on the left, respectively. Spacers 77,74 are fixed to work surface 12 while side bars 34,36 are fixed to the back plate 30 as described above. Retaining pins 73,75 are passed through the aligned holes on the right and left to maintain the plates 30,32 in their selected angular position with respect to horizontal work surface 12 (see alternate positions $P_1$–$P_5$ of FIG. 7). Since front plate 32 is attached to back plate 30 as described above, front plate 32 is provided with pivoting means at either end of the front edge 32a thereof. More particularly, blocks 41,43 are fixed to the work surface 12, inwardly adjacent side bars 40,42, respectively, with each having a pair of aligned holes 40a,41a and 42a,43a. A pair of retaining pins 78,76 are provided for passing through the aligned holes 40a,41a and 42a,43a, respectively, thereby establishing a pivot axis X—X about which front plate 32 may rotate. By changing the angular position of plates 30,32 relative to work surface 12, a worker may select the orientation of the work piece holder 28 to an angle which is comfortable to them. Given the repetitive nature of the brazing process, this is an important ergonomic consideration to reduce fatigue and repetitive motion injuries.

Returning discussion to the changeover process, in a preferred embodiment of the invention, the induction coils are each documented in an engineering drawing on a 1:1 scale. The engineering drawing is matched to the front plate to which the induction coil is associated with and carried on. As such, a worker may compare the induction coil tip configuration to the engineering drawing to ensure he has selected the proper coil configuration for the style about to be worked. This, together with the mounting of the coils on the front plate 32, essentially eliminates the possibility of mounting an incorrect coil configuration to the fixture, besides significantly reducing the amount of time a worker takes to identify and retrieve the coil configuration to be used on the work piece.

To summarize the changeover process, should the eyewear frame style being worked need to change, the worker would need to perform the following steps:

1) remove the induction coil heads 26d from the pair of induction units 26a,26b on back plate 30 (assuming those are the induction unit pair last being utilized), and insert the heads into the mounts 58,60 in front plate 32, respectively (the induction unit bases 26a,26b remain on back plate 30);

2) remove the front plate pivot pins 78,76 from holes 40a,41a and 42a,43a, respectively;

3) disconnect all hoses $H_1$–$H_5$ at interface 66;

4) lift and separate front plate 32 from back plate 30 by guiding the alignment pins out of holes 50a,50c along the rear edge 32b of front plate 32, and removing the front end 46d of cross bar 46 from space S (between the two middle spacers 44' of center bar 44);

5) select the appropriate new front plate 32 on which are carried (in the manner shown in FIG. 2) a new induction coil head pair in the mounts 58,60 thereof, respectively (e.g., coil pair 24a,24b or 25a,25b);

6) compare the coil tip configuration to the engineering drawing associated with that particular front plate to ensure they match;

7) mount the new front plate to the back plate 30 by establishing the alignment points discussed above and inserting the pivot pins 76,78; and 8) remove the new induction coil heads from the new front plate and attach them to the induction unit bases on back plate 30.

At this point, the changeover process is essentially complete. The new induction coils have the appropriate tip configuration for the new style being brazed, and is properly positioned with respect to the work piece holder.

There is thus provided a novel fixture and method for use at an induction brazing work station which significantly reduces the time, complexity, and expense of performing an induction unit changeover at a single work station. While the foregoing has described the invention with regard to a preferred embodiment thereof, various modifications may be made thereto as would be obvious to one skilled in the art.

What is claimed is:

1. In an induction brazing work station including a work surface, a work piece holder and at least one induction heating unit, said induction heating unit having a base and an induction coil removably attached to said base, said fixture comprising:

a) a front plate and a back plate each including opposite front, rear, and side edges and opposite top and bottom surfaces, said back plate being mounted upon said work surface;

b) means for removably mounting said front plate upon said work surface in coplanar relation to said back plate with said front plate rear edge and said back plate front edge lying in closely adjacent relation;

wherein said work piece holder is mounted to said front plate and the base of said induction unit is mounted to said back plate such that said induction unit heating coil extends to said work piece holder when said front and back plates are mounted to said work surface; and wherein said induction unit heating coil is uniquely matched to said work piece holder and said front plate.

2. The fixture of claim 1, and further including means for removably mounting said induction heating coil to said front plate when not in use.

3. The fixture of claim 2, and further comprising an engineering drawing of said heating coil matched to said front plate and said work piece holder whereby said coil is compared to said engineering drawing to ensure said heating coil is properly matched to said work piece holder and said front plate.

4. The fixture of said 1, and further comprising a plurality of hose quick disconnects mounted to at least one of said back and front plates.

5. The fixture of claim 1, wherein said front and back plates are mounted in parallel, spaced relation to said work surface.

6. The fixture of claim 5, and further comprising a side bar mounted in co-linear relation to each of said opposite sides of each said front and back plates.

7. The fixture of claim 6, and further comprising a center bar mounted to said bottom surfaces of each of said front and back plates approximately mid-way between and parallel to said front and rear edges thereof, respectively.

8. The fixture of claim 7, and further comprising a cross bar mounted to said bottom surface of said back plate and extending perpendicularly between said center bars of said back and front plates when said front plate is mounted to said work surface with said cross bar removably engaging said center bar of said front plate.

9. The fixture of claim 1, and further comprising means for adjustably pivoting said back plate and said front plate with respect to said work surface such that said back plate and said front plate lie at a preselected angle with respect to said work surface.

10. The fixture of claim 9, wherein said pivoting means comprises at least one arm having opposite first and second end portions, said first end portion being fixed to said work surface, and further comprising a plurality of through holes formed in longitudinally spaced relation along said arm, and further comprising a first pin for removable insertion through a selected one of said holes and said back plate, thereby positioning said back plate and front plate in said selected angular position with respect to said work surface.

11. The fixture of claim 10, and further comprising a second pin for removable insertion through said front plate side bar and a block mounted to said work surface adjacent said front plate side bar, said second pin establishing an axis X—X about which said back plate and said front plate may pivot with respect to said work surface.

12. The fixture of claim 11, and further comprising second arm having first and second end portions and a plurality of holes longitudinal formed therealong, said second arm first portion being mounted to said work surface, and further comprising third and fourth pins, said third pin being insertable through a selected one of said through holes in said second arm and said back plate, wherein said first and second arms are allocated adjacent said opposite side edges of said back plate, respectively.

13. The fixture of claim 1, and further comprising means for aligning said back plate and said front plate.

14. The fixture of claim 13 wherein said aligning means comprises at least one alignment pin fixed to said back plate adjacent said front edge thereof, said front plate rear edge including at least one hole wherethrough said alignment pin is passed upon mounting said front plate upon said work surface closely adjacent said back plate.

15. The fixture of claim 14, and further comprising first and second alignment pins and said holes, and wherein said first and second alignment pins are carried on a respective pair of liners mounted to said bottom surface of said back plate.

16. The fixture of claim 1, and further comprising means for selectively changing the position of said induction base on said back plate.

17. The fixture of claim 16 wherein said selective changing means comprises a plurality of through holes formed through said back plate, said through holes having a predetermined pattern defining at least two alternate positions for said induction base, said induction base further including at least one boss thereon for engaging with selected ones of said through holes in said back plate.

18. The fixture of claim 17, and further comprising two of said induction units, said pattern defining at least two alternate positions for each of said two induction unit bases on said back plate.

19. A method of mounting an induction brazing unit upon a work surface in a predetermined position with respect to a work piece holder, said induction unit having a base and a first coil for removable attachment to said base, said first heating coil having a unique coil configuration, said method comprising the steps of:

a) removably mounting a first front plate to said work surface, said work piece holder being mounted to said first front plate;

b) uniquely associating said first heating coil to said first front plate and said work piece holder; and c) removably attaching said first heating coil to said base with said first coil extending adjacent to said work piece holder.

20. The method of claim 19, and further comprising the step of removably mounting said first coil to said first heating front plate when said induction unit is not in use.

21. The method of claim 20 and further comprising the step of mounting a back plate to said work surface adjacent said first front plate, said induction unit base mounted to said back plate.

22. The method of claim 21, and further comprising means for selectively alternating the position of said induction unit base on said back plate.

23. The method of claim 22 wherein said means comprises a plurality of holes in said back plate wherein a boss on said base may be selectively inserted.

24. The method of claim 21 wherein said first front plate and said back plate lie coplanar with respect to each other.

25. The method of claim 24 wherein said front plate and said back plate are adjustably pivotable with respect to said work surface.

26. The method of claim 19 and further comprising a second front plate and a second heating coil uniquely associated with said second front plate and a second work piece holder mounted upon said second plate, wherein said second front plate is interchangeable with said first front plate on said work surface.

27. The method of claim 26 and further comprising a plurality of quick disconnect hose lines mounted to said first and second front plates.

28. The method of clam 26 wherein said second coil is removably mounted to said second front plate when said second heating coil is not in use.

* * * * *

UNITED STATES PATENT AND TRADEMARK OFFICE
CERTIFICATE OF CORRECTION

PATENT NO. : 5,977,527
DATED : November 2, 1999
INVENTOR(S) : Mark E. Preston, et. al.

It is certified that error appears in the above-identified patent and that said Letters Patent is hereby corrected as shown below:

Column 7, line 44, delete "said" and insert --claim-- therefor.

Column 8, line 66, after the word "first", insert --heating--.

Column 8, line 67, delete "heating".

Signed and Sealed this

Second Day of May, 2000

Attest:

Q. TODD DICKINSON

*Attesting Officer*  *Director of Patents and Trademarks*